United States Patent [19]

Wood, Jr.

[11] Patent Number: 5,061,110
[45] Date of Patent: Oct. 29, 1991

[54] BALL JOINT AND METHOD OF ASSEMBLY
[75] Inventor: Ruey E. Wood, Jr., Mt. Clemens, Mich.
[73] Assignee: TRW Inc., Lyndhurst, Ohio
[21] Appl. No.: 652,434
[22] Filed: Feb. 8, 1991
[51] Int. Cl.⁵ .............................................. F16C 11/00
[52] U.S. Cl. .................................... 403/133; 403/140; 403/141; 29/898.046
[58] Field of Search ................. 403/77, 141, 140, 135, 403/122, 133; 29/898.044, 898.045, 898.046, 898.047, 898.048, 898.051, 898.056, 898.058

[56] References Cited
U.S. PATENT DOCUMENTS

| | | |
|---|---|---|
| 1,898,100 | 2/1933 | Skillman . |
| 1,943,631 | 1/1934 | Skillman ........................ 29/898.046 |
| 2,420,621 | 5/1947 | Ricks . |
| 2,910,316 | 10/1959 | Dier . |
| 2,979,353 | 4/1961 | Sellers, Jr. . |
| 3,006,673 | 10/1961 | Swick .................................. 403/122 |
| 3,367,728 | 2/1968 | Labbie ........................... 403/122 X |
| 4,712,940 | 12/1987 | Wood, Jr. . |
| 4,890,949 | 1/1990 | Wood, Jr. . |

Primary Examiner—Andrew V. Kundrat
Attorney, Agent, or Firm—Tarolli, Sundheim & Covell

[57] ABSTRACT

A ball joint comprises a sheet metal socket having a spherical chamber with first and second openings into the chamber. An elastomeric bearing encapsulating the ball end of a stud supports the stud with the ball end in the socket chamber, and with the stud shank extending from the first opening. The socket comprises a semi-spherical sheet metal wall portion which defines the second opening, and which is at least partially comprised of segments separated by seams extending from the second opening toward the first opening.

11 Claims, 2 Drawing Sheets

BALL JOINT AND METHOD OF ASSEMBLY

FIELD OF THE INVENTION

The present invention relates to a ball joint for a vehicle suspension or steering linkage, and particularly relates to a ball joint having a sheet metal socket.

BACKGROUND OF THE INVENTION

Ball joints having sheet metal sockets are known. For example, U.S. Pat. No. 2,979,353 discloses a ball joint having a sheet metal socket. The ball joint of U.S. Pat. No. 2,979,353 includes a stud and a bearing supporting the stud in the sheet metal socket. The socket is a single piece of sheet metal which is shaped in a die forming process. At one stage in the die forming process, the piece of sheet metal has a cylindrical shape defining a chamber with an opening. The stud and the bearing are inserted into the chamber through the opening. The piece of sheet metal is then deformed in the die forming process to reduce the size of the opening so that the bearing and the ball end of the stud are enclosed within the socket chamber. When the piece of sheet metal is deformed to reduce the size of the opening, it is forced from a cylindrical shape into a spherical shape. The bearing within the socket chamber is thereby forced into a spherical shape. It is known that the sheet metal material of a socket tends to gather at the opening when being deformed from a cylindrical shape to a spherical shape.

SUMMARY OF THE INVENTION

In accordance with the present invention, a ball joint comprises a sheet metal socket, a steel stud, and an elastomeric bearing. The socket comprises a piece of sheet metal having a spherical chamber with an axis, a first opening into the chamber, and a second opening into the chamber. The openings into the chamber are centered on the axis of the chamber. The stud comprises a ball and a shank extending from the ball. The bearing supports the stud in the socket, with the ball in the chamber and the shank extending outwardly from the first opening. The elastomeric material of the bearing is forced into a spherical shape by the socket and is compressively preloaded between the ball and the socket. The socket has a semi-spherical sheet metal wall portion which defines the second opening. The semi-spherical sheet metal wall portion of the socket is at least partially formed in segments separated by seams extending from the second opening toward the first opening.

Further in accordance with the invention, a method of assembling a ball joint comprises the steps forming a piece of sheet metal to define a chamber having an axis, a first opening into the chamber which is centered on the axis, and a second opening into the chamber which is also centered on the axis. The piece of sheet metal has a cylindrical portion which defines the second opening, and which has triangular gaps extending from the second opening along the axis. A socket is thus partially formed from the piece of sheet metal.

A bearing is bonded to the ball end of the stud to encapsulate the ball end of the stud. The bearing and stud are inserted in the socket in a position with the bearing in the chamber and the stud extending outwardly from the first opening. Either before or after the bearing and stud are inserted in the socket, the generally cylindrical portion of the socket is deformed to take a semi-spherical shape. The gaps are then closed so that the semi-spherical portion of the socket is formed at least partially in segments separated by seams extending from the second opening toward the first opening.

The present invention enables a sheet metal socket for a ball joint to have a semi-spherical portion in which the sheet metal material is not gathered or increased in thickness around an opening for the bearing and the stud. The triangular gaps in the cylindrical portion of the socket enable it to be deformed into a semi-spherical shape without gathering of the sheet metal material around the opening, because the gaps provide clearance for the separate segments of sheet metal material to be moved radially together toward the axis of the socket without interfering with each other.

BRIEF DESCRIPTION OF THE DRAWINGS

These and other features of the present invention will become apparent to those of ordinary skill in the art upon reading the following description of preferred embodiments of the invention in view of the accompanying drawings, wherein:

FIG. 6 is a view taken on line 6—6 of FIG. 1.

DESCRIPTION OF PREFERRED EMBODIMENTS

Figure 1:
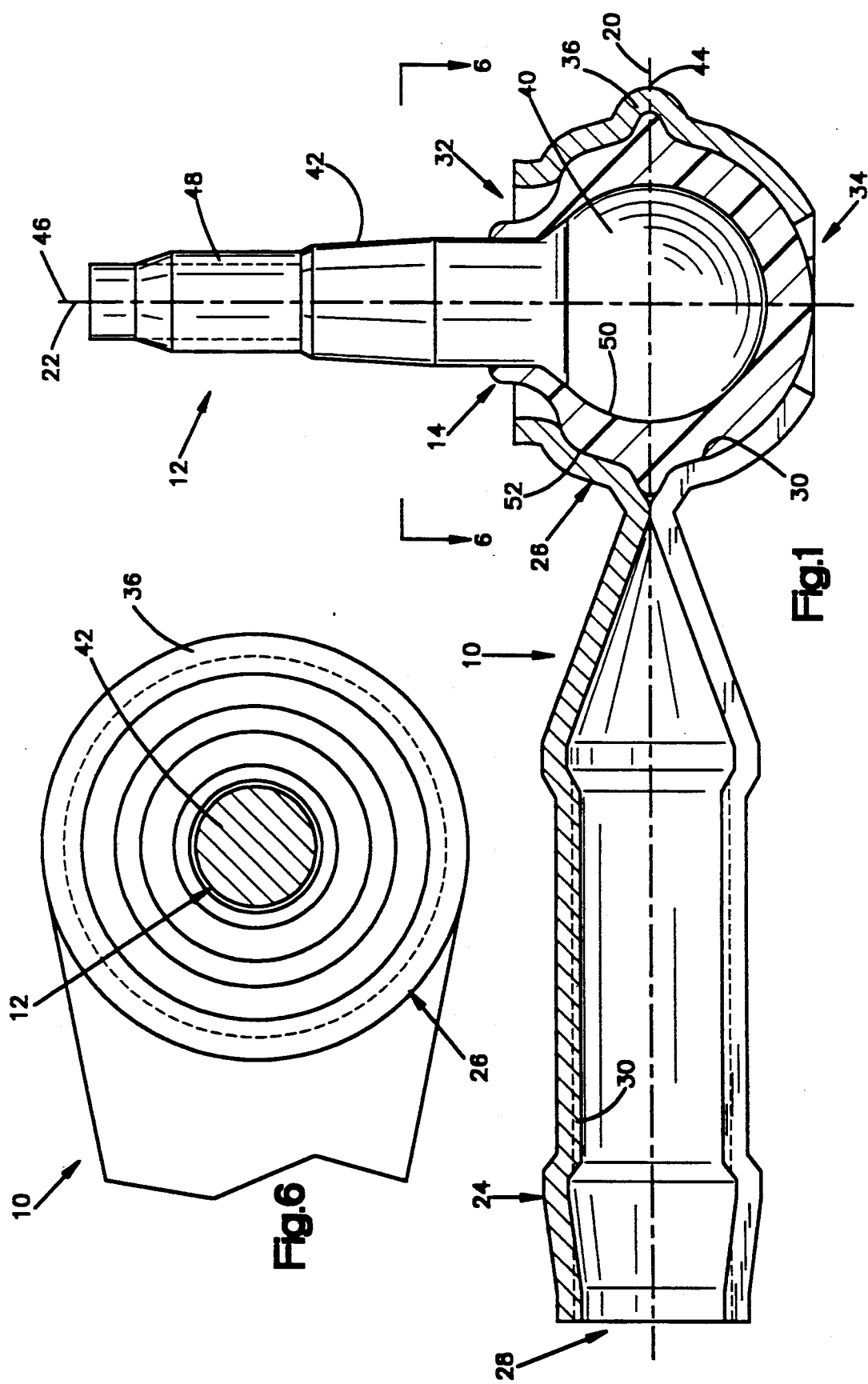
FIG. 1 is a sectional view of a ball joint in accordance with the present invention.

As shown in FIG. 1, a ball joint in accordance with the present invention comprises a socket 10, a stud 12, and a bearing 14.

The socket 10 is stamped from sheet metal using a progressive die, and is preferably formed of SAE grade 950 steel supplied by Worthington Steel Co. with the trademark "Maxi-form 50". The socket 10 could alternately be formed of any SAE/ASTM grade of stamping material suitable to meet the strength, ductility and formability requirements of the process and the final product application.

The socket 10 has a horizontal axis 20, a vertical axis 22, a first end portion 24 remote from the vertical axis 22, and a second end portion 26 centered on the vertical axis 22. The first end portion 24 of the socket 10 has an opening 28 and a threaded inner surface 30 for receiving the threaded end of a tie rod in a vehicle steering linkage. The second end portion 26 of the socket 10 has an inner surface 30 defining a spherical chamber. The second end portion 26 of the socket 10 also has an upper opening 32, a lower opening 34, and an annular reinforcing portion 36. The upper and lower openings 32 and 34 are centered on the vertical axis 22. The annular reinforcing portion 36 has an arcuate profile centered on the horizontal axis 20 as shown in FIG. 1, and extends circumferentially around the vertical axis 22.

The stud 12 is preferably formed of SAE 8115, 8615, 8640, or similar grade steel which is cold formed or machined, carburized or carbonitrided to a 20–30 Rc core hardness and a 0.006–0.015 inch case depth, and supplied by Republic Steel Corp. The stud 12 comprises a ball 40 and a shank 42 extending from the ball 40. The ball 40 has a horizontal axis 44 extending in a plane bisecting the ball 40. The shank 42 has a longitudinal axis 46 perpendicular to the horizontal axis 44, and has threads 48 for connecting the stud 12 to a threaded component of a vehicle steering linkage.

The bearing 14 is formed of an elastomeric material. Preferably, the bearing 14 is formed of natural rubber (poly-isoprene) which is Banbury mixed and insert molded by injection and/or compression molding, and supplied by Yale-South Haven, Inc. of South Haven, Mich. The bearing 14 has an inner surface 50 and an outer surface 52. The inner surface 50 is adhered to the ball 40 and to an adjacent portion of the shank 42. The bearing 14 thus encapsulates the ball 40. Chemlock adhesive, supplied by Hughson Chemical Co., is preferably used in a two-step adhesive coating process to form a bond at which the inner surface 50 of the bearing 14 is adhered to the stud 12. The outer surface 52 of the bearing 14 is firmly pressed in frictional engagement with the inner surface 30 of the socket 10. The bearing 14 is preloaded between the ball 40 and the inner surface 30 of the socket 10, and exerts an elastic bias resisting movement of the ball 40 in the socket chamber.

The present invention comprises a method of assembling the ball joint shown in FIG. 1. The method is preferably performed in one of two different optional procedures. In either case, the socket 10 is a single piece of sheet metal which is deformed in a stamping process.

Figure 2:
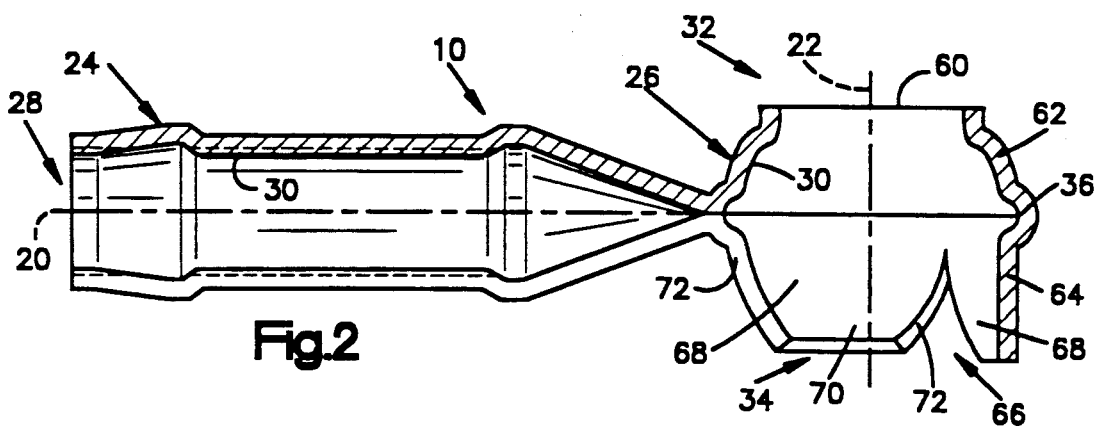
FIG. 2 is a sectional view of a part of the ball joint of FIG. 1 at one stage in assembly of the ball joint.

In one optional procedure, the socket 10 is formed into the shape shown in FIG. 2 in the stamping process. As shown in FIG. 2, the second end portion 26 of the socket 10 comprises a sheet metal wall 60 having an upper wall portion 62 and a lower wall portion 64. The upper wall portion 62 defines the upper opening 32, and is shaped to permit a desired amount of pivotal movement of the shank 42 in the upper opening 32. The lower wall portion 64 defines the lower opening 34, and is formed to have triangular gaps 66, one of which is shown in the sectional view of FIG. 2. The gaps 66 extend from the lower opening 34 toward the upper opening 32, and define separate segments 68 of the lower wall portion 64. The segments 68 have inner surfaces 70, and have edge surfaces 72 transverse to the inner surfaces 70. The edge surfaces 72 preferably extend as shown from the lower opening 34 to the reinforcing section 36 of the socket 10.

Figure 3:
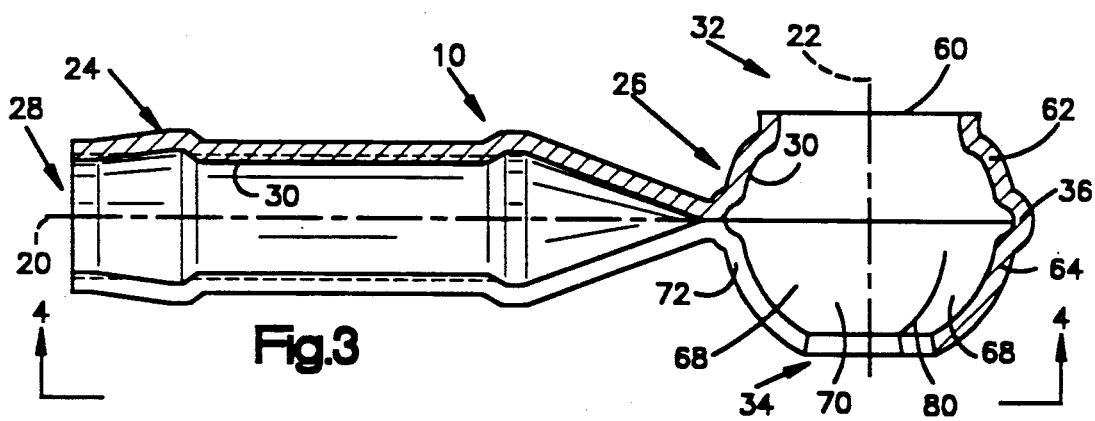
FIG. 3 is a sectional view of the part of FIG. 2 at another stage in assembly of the ball joint.
Figure 4:
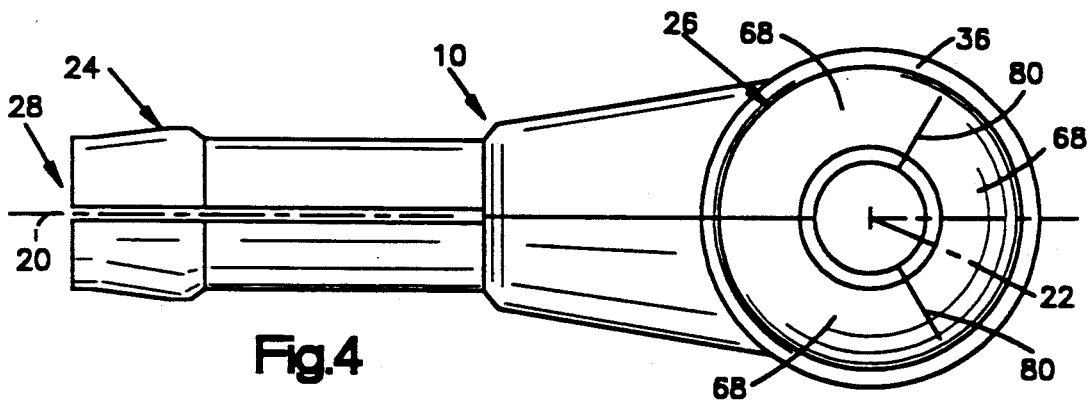
FIG. 4 is a view taken on line 4—4 of FIG. 3.

After the socket 10 is formed into the shape shown in FIG. 2, the stud 12 and the bonded bearing 14 are inserted into the socket chamber through the lower opening 34. The socket 10 is then deformed from the shape shown in FIG. 2 to the shape shown in FIG. 3. As shown in FIG. 3, the lower wall portion 64 of the socket 10 is deformed from the cylindrical shape shown in FIG. 2 to a semi-spherical shape, and the diameter of the lower opening 34 is reduced. During such deformation of the lower wall portion 64, the segments 68 are moved radially toward the vertical axis 22 so that the edge surfaces 72 of adjacent segments 68 are moved into abutting contact with each other. The segments 68 then have adjacent positions in an array extending circumferentially about the vertical axis 22, and the edge surfaces 70 define seams 80 between adjacent segments 68. As shown in the bottom view of FIG. 4, the seams 80 converge toward the vertical axis 22.

When the lower wall portion 64 of the socket 10 is deformed into a semi-spherical shape shown in FIG. 3, the elastomeric material of the bearing 14 between the ball 40 and the inner surface 30 of the socket 10 is forced into a corresponding spherical shape, and is compressively preloaded. The present invention enables the lower wall portion 64 of the socket 10 to be deformed into a semi-spherical shape to reduce the diameter of the lower opening 34 and to compressively preload the bearing 14 without causing the sheet metal material of the lower wall portion 64 to gather or increase in thickness around the lower opening 34. The gaps 66 provide clearance for the adjacent segments 68 to move radially toward the vertical axis 22 into the positions shown in FIG. 3 without interfering with each other, and without causing gathering or an increase in thickness of the sheet metal material.

Figure 5:
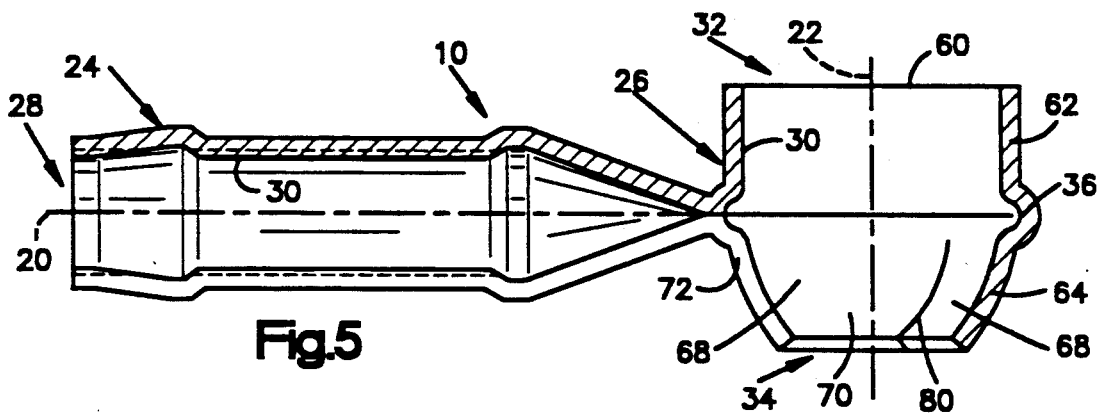
FIG. 5 is a sectional view of a part of a ball joint formed in accordance with an alternate embodiment of the present invention.

In another optional procedure, the socket 10 is formed into the shape shown in FIG. 5 before the stud 12 and the bonded bearing 14 are assembled into the ball joint. As shown in FIG. 5, the lower wall portion 64 of the socket 10 takes a semi-spherical shape with seams 80 converging toward the vertical axis 22, but the upper wall portion 62 is cylindrical. The stud 12 and the bonded bearing 14 are inserted into the socket chamber through the upper opening 32, and the upper wall portion 62 is then deformed into the shape shown in FIG. 3. The bearing 14 is preloaded upon deformation of the upper wall portion 62 against the bearing 14 in this optional procedure. If necessary to avoid gathering or an increase in thickness of the sheet metal material around the upper opening 32, the upper wall portion 62 of the socket 10 could similarly be formed with gaps that close to define seams.

The invention has been described with reference to preferred embodiments of the invention. Improvements, changes and modifications will become apparent to those of ordinary skill in the art. Such improvements, changes and modifications are intended to be included within the scope of the appended claims Having described the invention, the following is claimed:

1. A ball joint comprising:
   a socket comprising a piece of sheet metal defining a spherical chamber having an axis, a first opening into said chamber, and a second opening into said chamber, said openings being centered on said axis;
   a stud comprising a ball and a shank extending from said ball;
   an elastomeric bearing supporting said stud in said socket with said ball in said chamber and said shank extending outwardly from said first opening, said bearing having a spherical shape and being compressively preloaded in said chamber; and
   said piece of sheet metal comprising a semi-spherical sheet metal wall portion, said wall portion defining said second opening, and at least partially comprising segments separated by seams extending from said second opening toward said first opening.

2. A ball joint as defined in claim 1 wherein said piece of sheet metal comprises a first end portion including means for connecting said socket to a component of a vehicle steering linkage, and a second end portion including said chamber.

3. A ball joint as defined in claim 1 wherein said segments of said semi-spherical sheet metal wall portion have inner surfaces facing said ball, and have edge surfaces transverse to said inner surfaces, said edge surfaces being in abutting contact to define said seams.

4. A socket member for a ball joint comprising:
   a piece of sheet metal having a first end portion, a second end portion, and a first axis;

said first end portion comprising means for connecting said socket member to a component of a vehicle steering linkage; and said second end portion defining a chamber for containing the ball end of a ball stud connectable to a component of a vehicle steering linkage, said second end portion having a second axis perpendicular to said first axis, and having a wall portion defining a portion of said chamber, said wall portion being formed in segments having edge surfaces in abutting contact to define seams between said segments, said seams converging toward said second axis.

5. A socket member as defined in claim 4 wherein said wall portion has an arcuate profile and a uniform thickness.

6. A socket member as defined in claim 4 wherein said segments of said wall portion have adjacent positions in an array extending circumferentially about said second axis, said seams separating said positions circumferentially.

7. A socket member as defined in claim 4 wherein said wall portion defines an opening centered on said second axis, said seams extending from said opening.

8. A socket member as defined in claim 7 wherein said second end portion of said piece of sheet metal further comprises a second wall portion defining a second opening centered on said second axis, said second opening providing clearance for a shank portion of a ball stud to move in said second opening.

9. A method of assembling a ball joint comprising the steps of:

encapsulating the ball end of a stud in an elastomeric bearing and bonding said ball end to said bearing;

forming a piece of sheet metal to define a chamber having an axis, a first opening into said chamber, and a second opening into said chamber, said openings being centered on said axis, and to define a cylindrical portion of said piece of sheet metal having triangular gaps extending from said second opening toward said first opening;

locating said bearing and said ball in said chamber with said stud extending outwardly from said first opening; and deforming said cylindrical portion of said piece of sheet metal to form a semi-spherical portion of said piece of sheet metal, said deforming of said cylindrical portion reducing the size of said second opening and closing said triangular gaps so that said semi-spherical portion at least partially comprises segments separated by seams extending from said second opening toward said first opening.

10. A method as defined in claim 9 wherein said deforming of said cylindrical portion of said piece of sheet metal compressively loads said elastomeric bearing.

11. A method as defined in claim 10 wherein said deforming of said cylindrical portion of said piece of sheet metal forces said bearing into a spherical shape complementary to said semi-spherical portion of said piece of sheet metal.

* * * * *